Figure 1:
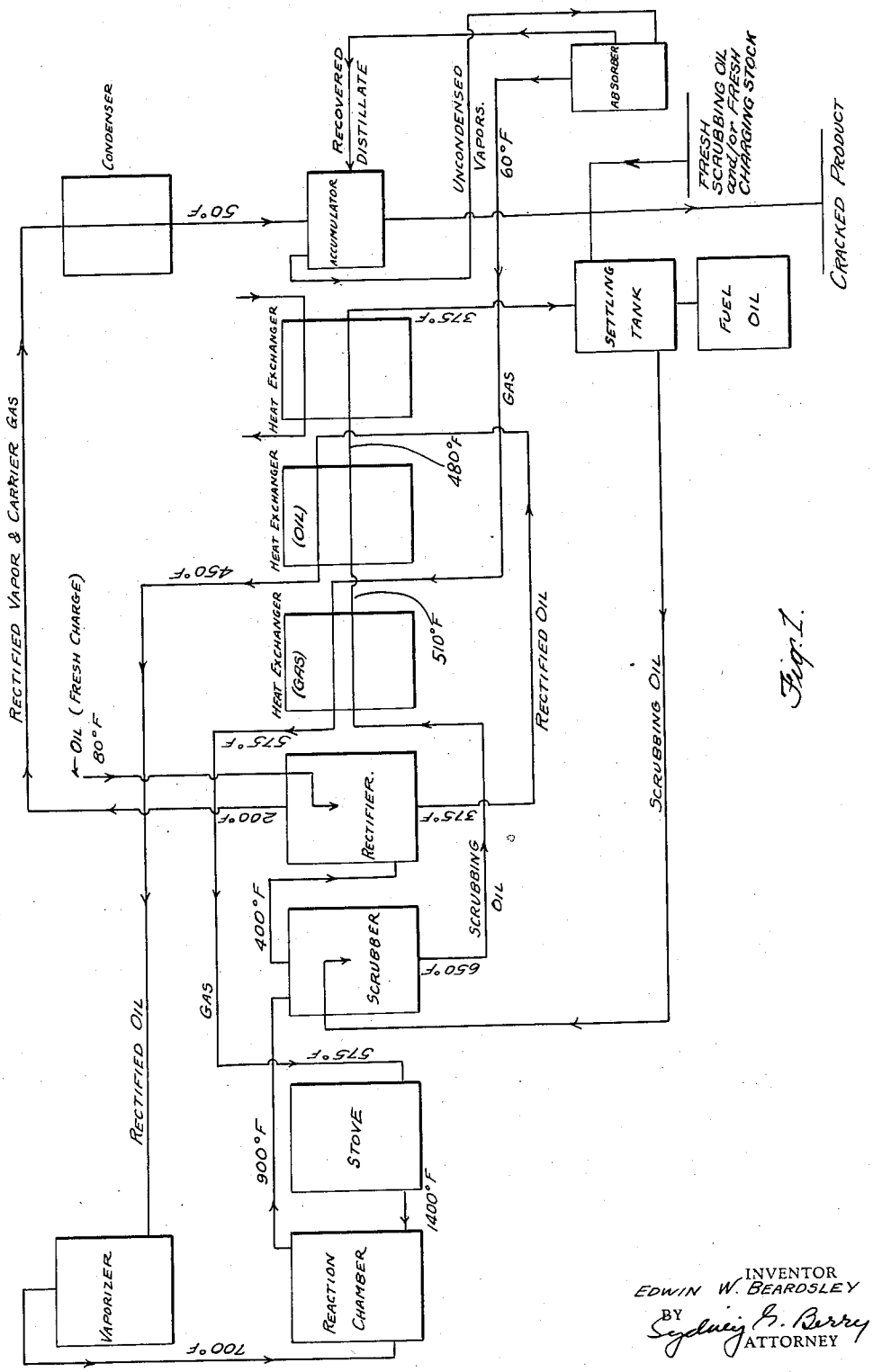

Oct. 18, 1932.    E. W. BEARDSLEY    1,883,744
CONVERSION OF HYDROCARBON OILS
Filed April 2, 1928    2 Sheets-Sheet 2

INVENTOR
EDWIN W. BEARDSLEY
BY
Sydney G. Berry
ATTORNEY

Patented Oct. 18, 1932

1,883,744

UNITED STATES PATENT OFFICE

EDWIN W. BEARDSLEY, OF TEXAS CITY, TEXAS, ASSIGNOR TO PETROLEUM CONVERSION CORPORATION, OF NEW YORK, N. Y., A CORPORATION OF DELAWARE

CONVERSION OF HYDROCARBON OILS

Application filed April 2, 1928. Serial No. 266,535.

My invention relates to a process for converting or cracking hydrocarbon oils into compounds of a different and preferably predominently lower molecular weight, as for example the production of gasoline from heavier petroleum oils. More particularly it relates to that type of conversion or cracking process in which the cracking of the oil is accomplished in the vapor phase, and is in part concerned with the removal from the vapor products of the conversion reaction of suspended or entrained carbon, and also with a novel utilization of the heat which is removed from such products simultaneously with said carbon. The invention also contemplates the recovery of the carbon in a merchantable form.

While not limited to its application thereto, my invention may be regarded as an improvement over, and a development of, the system of converting oils described in the application of Beardsley and Colony filed October 31, 1925, Serial No. 65,906, now Patent No. 1,842,318 and also of a further application filed June 28, 1927, Serial No. 201,981, now Patent No. 1,784,126. In the systems disclosed in said applications, the oil to be converted is first vaporized and then physically mingled with heat carrier gases which are of such a temperature and contain sufficient heat units as to bring about the desired conversion reaction. The products from the reaction chamber are then subjected to various steps of rectification and condensation in which certain heat economies are effected. In the application of the present invention to such a system, I contemplate first removing the carbon from the products directly from the reaction chamber by scrubbing such products with a suitable medium which at the same time absorbs a desired quantity of heat units therefrom. In this manner the reaction products are deprived of their carbon content before they are passed through any apparatus which the carbon may clog. Such scrubbed products are then passed directly to the rectifying and condensing columns.

A major problem presented by any system of cracking and particularly by the type in which the conversion is accomplished by heat carrier gases is the efficient distribution of the excess heat contained in the products from the reaction chamber which must be removed from such products and which is available to heat other products in the system requiring it. It is my observation that in prior systems not enough of the excess heat in such products has been transferred to what may be termed the head end of the system. Consonant with this discovery in the present system of converting oils I use a maximum amount of available heat in the products from the reaction chamber to raise the temperature of the carrier gases prior to their admission to the heating element employed, using the balance of the available heat to raise the temperature of the incoming oil and to maintain a proper heat balance in the rest of the system.

It is also a further feature of the invention that the heat transfer from the products leaving the reaction chamber is accomplished by the use of a liquid medium which after contact with such products is used indirectly to heat other products in the system including the carrier gas. In this manner advantage is taken of the fact that for indirect heating a much greater efficiency is obtained by means of a liquid to gas thermal contact than by a gas to gas thermal contact.

Further objects to be attained and advantages derived from my invention will be apparent from the following detail description taken with the accompanying drawings in which, Figure 1 is a diagram or flow-sheet of a plant embodying the invention in a preferred form.

Figure 2:
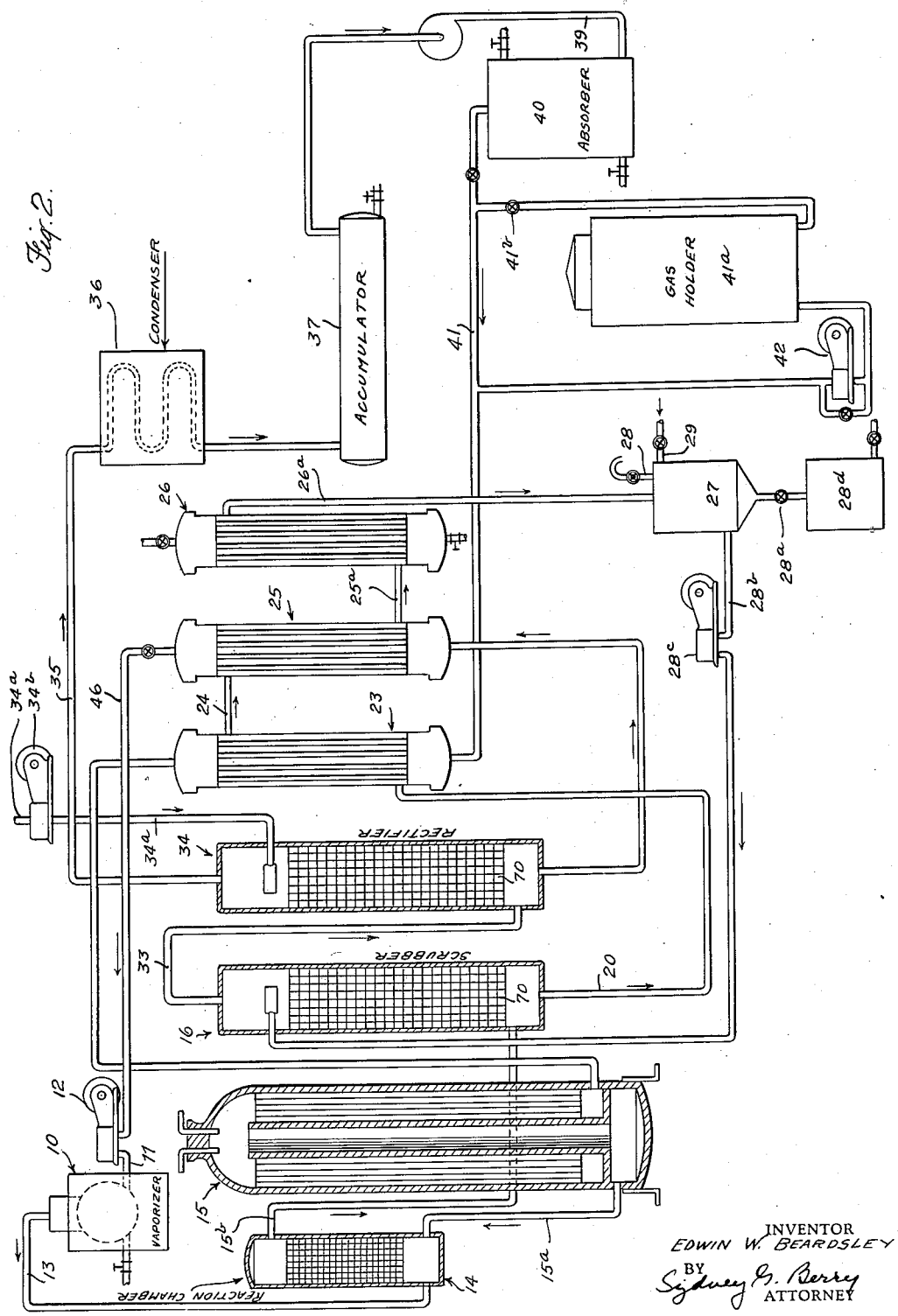

Figure 2 illustrates such plant in greater detail.

Referring to Figure 2, petroleum oil or other hydrocarbons to be cracked preferably suitably preheated in a manner and from a source in the system to be described, is introduced into an evaporator or a vaporizer 10, through a pipe 11, a feed pump 12 being used to bring the oil up to the pressure obtaining in the evaporator, which preferably is maintained at a slightly greater value than that prevailing in the rest of the system. In this evaporator the oil is subjected to such a heating action as will vaporize it without the oil undergoing any substantial cracking, steam or a neutral gas or both, being used as an aid to the vaporization.

Vapor leaves the evaporator 10 through a pipe 13 through which it is conducted to the reaction chamber 14 wherein it is destined to be converted by the action of the hot gaseous products from the stove 15 introduced into said chamber through pipe 15a. These gases constituting the heat carrier preferably consist in large part of the residual gas produced in the system, although other and neutral gases may be employed, as for example, natural gas. Mixed with the gas is preferably a desired proportion of steam. When gases of a hydrocarbon origin are used as is preferred the composition of such gases tends to consist chiefly of hydrogen and methane due to the intense heating undergone in the hot blast stoves or other heating element used.

The oil vapors having been converted or cracked in the reaction chamber 14, are conducted through a pipe 15b to scrubber 16, wherein the gas and vapor products are deprived of the carbon held in suspension. For this purpose I employ a suitable scrubbing medium which preferably consists in large part of a heavy oil. The temperature within the scrubber is of course maintained sufficiently high so as not to condense out fractions from the reaction products which it is desired to remove in the subsequent steps of the process to be described.

It will be evident that by virtue of the intimate contact of the scrubbing fluid desirable for the carbon removal, such fluid may also be caused to act as an equally efficient heat transfer medium by suitable regulation of the initial temperature and volume of such fluid. As previously mentioned it is a feature of the invention that this quantity of abstracted heat is used to heat products at different points in the operating cycle as will be described.

The scrubbing medium, leaving the scrubber 16, passes preferably through a pipe 20, to a heat exchanger 23 in which it gives up a portion of its heat, preferably to the carrier gas, which is on its way to the heating element used, in which it is to be raised to above the conversion temperature. From exchanger 23 the scrubbing medium is preferably passed through pipe 24 to a second exchanger 25 wherein its temperature is further reduced, this time heating up the oil from the rectifying column (to be described) on its way to the evaporator 10 for the reaction products. From exchanger 25 the scrubbing medium may, if desired, be passed by means of pipe 25a to a third exchanger 26 wherein its heat may be further abstracted and used for any desired purpose not shown.

From exchanger 26, the scrubbing medium passes through a pipe 26a to a reserve supply and settling tank 27 provided with a valved vent 28, a draw-off connection 28a and a return pipe 28b through which the oil is pumped by pump 28c back to the scrubber 16. In tank 27 the carbon in the oil settles out and preferably is continuously withdrawn through draw-off pipe 28a into tank 28d.

If desired, I may employ the scrubber 16 for the purpose of removing the lighter fractions of, or "top" any oil used as the scrubbing medium, in which case the fractions vaporized are added to the gas and vapor products containing the vapors of the product desired. It will thus be seen that the scrubbing medium operates in a closed cycle composed of the scrubber 16, the exchangers 23, 25 and 26 in series, pipe 26a, tank 27 and pump 28c. For the purpose of admitting oil to the scrubbing cycle, tank 27 is provided with an inlet connection 29.

To return to the reaction products which were stated to have passed through scrubber 16, such products now deprived of the entrained carbon and small quantities of such other components as for example very heavy ends which may be condensed out, pass through a pipe 33 to a rectifying column 34 wherein the products heavier than the desired product are condensed out preferably by use of the oil entering the system which is admitted through pipe 34a. From rectifying column 34 the vapors and gases pass through pipe 35 to condenser 36 from which the cracked or converted product is collected in an accumulator 37. The gas remaining uncondensed, which, it will be evident, includes the carrier gases originally used, and any fixed gas which may have been produced from the reaction, passes through pipe 39 to an absorber 40, wherein it is stripped of the residual gasoline or other light vapors, by means of a suitable absorbing medium. From absorber 40 the gases pass through pipe 41 to the heating element or hot blast stove 15, passing, however, as has been mentioned, through the exchanger 23, wherein their temperature is raised by several hundred degrees. For storing excess gas a holder 41a is provided which communicates with the pipe 41 by means of a connection having a suitable reducing valve 41b. A pump 42 brings the pressure of the gas from holder 41a up to that prevailing in the system.

The liquid medium used in rectifying column 34 is preferably the entering oil, the oil after leaving said column and additioned by such products as have condensed out therein, passing through heat exchanger 25, wherein its temperature is raised by heat received from the scrubbed products of reaction as has been stated. From exchanger 25 the oil now at its highest temperature prior to its introduction to the evaporator, passes through pipe 46—11, feed pump 12, to the evaporator 10. The cycle of the entering oil may be summarized as follows: Oil enters the system through pipe 34a, passes through pump 34b to rectifying column 34 and thence to evaporator 10.

In the flow sheet of Fig. 1, in order to aid in the understanding of the system, I have indicated the approximate temperatures at various points therein, it being understood that such temperatures are by way of example only, and may be widely varied for different operating conditions, and different starting materials. Referring to Fig. 1 it will be seen that the products leave the reaction chamber at around 900 degrees F. the scrubber 16 at around 400 degrees F. and the rectifying column at around 200 degrees F. The heat carrier gases leave the stripper at around 60 degrees F. and upon passing through the heat exchanger 23 are raised to the neighborhood of 575 degrees F. The temperature of the oil leaving the rectifier 34 may be in the neighborhood of 375 degrees and after passing through heat exchanger 25 is raised to around 450 degrees and at such temperature is fed to the evaporator 10.

It will be understood that the hot blast stove 15 shown is one of a battery and that the usual means are provided for bringing one stove up to temperature while another is being run. When the oil to be converted contains a substantial proportion of light ends, such oil may in part at least be admitted to the system by way of the scrubber 16, it being understood that while fractionation of the oil also takes place in the rectifier 34 the temperatures prevailing therein are considerably lower than in the scrubber 16. When oil suitable for cracking (containing light ends or not) is introduced into the scrubbing cycle, the ends which undergo evaporation below say 750 degrees, are admitted to the vapor products leaving the scrubber, and the component of such vapors condensed out in the rectifying column 34 will be fed to the evaporator 10 through pipes 46 and 11. It will be understood that when the charging stock is introduced into the system by way of the scrubber it is not necessary that fresh oil be fed to the rectifier 34 but this may be operated strictly as a rectifier or dephlegmator as well known in the art.

In practice I find that when oil containing light ends is introduced into the system by way of the scrubber 16, the product obtained therefrom has a greater anti-knock value than can be accounted for on the basis of a simple fractionation of the oil so added.

A further advantage of my present invention is that under the conditions of carbon removal specified the tar formed in the conversion reaction is also removed.

If desired, the carbon may be removed from the scrubbing medium by filtration instead of settling, although in practice I have found that the carbon suspended in the liquid oil medium is comparatively easily handled and is satisfactorily removed by settling.

In both the scrubber 16 and rectifier 34, I employ a suitable filling material 70 in order to cause the oil to have extensive film surfaces. Particularly with reference to the removal of suspended carbon I find such filling material to be of great efficiency in bringing about an efficient scrubbing of the reaction products by the liquid medium. It will be noted that in scrubber 16 the path of the scrubbing medium is counter-current to that of the products to be scrubbed thereby making for the highest efficiency of heat transfer. Such counter flow also provides the best conditions for stripping of the condensable vapors from the products from the reaction chamber as well as the rectification of the oil constituting the scrubbing medium.

Various changes may be made in the described illustrative embodiment of the invention. Thus the entering oil instead of being admitted directly to the rectifier 34 and then passed through the heat exchanger 25, may first be passed through said exchanger and then passed to the rectifier, and thence to evaporator 10.

It will be understood that while my invention has been described with reference to a vapor phase cracking system, it is in its broader aspects not limited thereto.

What I claim is:

1. In the process of converting oil in the vapor phase in which the vapor to be converted is mingled with a heat-carrier gas having sufficient heat units to accomplish the conversion of the vapor so mingled therewith, the steps which consist in introducing the oil vapor into a reaction zone wherein conversion takes place and carbon is formed, passing the vapor products from said zone directly into a second zone, there introducing a scrubbing oil having light and heavy fractions under conditions of gas and liquid contact as to deprive said vapor products of substantially all of their entrained carbon and a portion of the heat in said products, passing said thus heated scrubbing oil as then constituted in the indirect heat exchange relation with the heat carrier gas and the hydrocarbon material to be converted continuously removing the carbon from said scrubbing oil as then constituted and re-using the carbon-deprived oil in said second zone as the scrubbing oil.

2. In the process of converting hydrocarbons in the vapor phase, the steps which consist in admitting to a heated reaction zone vapor of the hydrocarbon material to be converted, allowing the conversion reaction to take place by virtue of the heat furnished in said zone, said reaction resulting in the formation of free carbon, passing the non-liquid fluid products including said free carbon entrained therewith in a stream from said zone into a second zone, there introducing a scrubbing agent comprising a hydrocarbon liquid, under conditions of gas and liquid contact as to deprive said stream of products of substantially all of their entrained carbon as well as a portion of the heat in said stream of products, then returning the heat acquired by said scrubbing liquid to said reaction zone by passing said liquid as then constituted in indirect thermal contact with a material destined for the reaction zone, removing carbon from said scrubbing oil and then re-using at least a portion of said oil as the scrubbing liquid.

3. The process according to claim 2 in which said gas and liquid contact conditions comprise a counter-current flow of the uncondensed products from the reaction zone to the scrubbing liquid.

4. In the process of converting hydrocarbons in the vapor phase, the steps which consist in admitting to a heated reaction zone vapor of the hydrocarbon material to be converted, allowing the conversion reaction to take place by virtue of the heat furnished in said zone, said reaction resulting in the formation of free carbon, passing to non-liquid fluid products including said free carbon entrained therewith in a stream from said zone into a second zone, there introducing a scrubbing agent comprising a hydrocarbon liquid, under conditions of gas and liquid contact as to deprive said stream of products of substantially all of their entrained carbon as well as a portion of the heat in said stream of products, then returning the heat acquired by said scrubbing liquid to said reaction zone by passing said liquid as then constituted in indirect thermal contact with a material destined for the reaction zone, continuously removing the carbon from said scrubbing oil and a portion of said oil as residue, and then using a further portion of the carbon-deprived oil as the scrubbing liquid.

5. In the process of converting hydrocarbon oils in the vapor phase by the aid of a heated non-condensible heat-carrier gas, the steps which consist in admitting a hydrocarbon liquid to a vaporizing zone, admitting to a reaction zone products destined therefor, including the hydrocarbon vapor formed in said vaporizing zone and said heat-carrier gas, allowing the conversion reaction to take place in absence of liquid oil as a result of which such free carbon as is formed is entrained with the vapor products of the conversion reaction, passing the non-liquid fluid products from said zone in a stream to a second zone and there introducing a scrubbing agent comprising a hydrocarbon liquid under conditions of gas and liquid contact as to deprive said stream of products of substantially all of their entrained carbon as well as a portion of the heat in said products, and under conditions of temperature as to strip said scrubbing liquid to render it free of any substantial quantity of hydrocarbon constituents which it is desired to return to said vaporizing zone, then returning heat acquired by the residual scrubbing liquid to the reaction zone by passing said liquid as then constituted in indirect thermal contact with at least one of said products stated to be destined for said reaction zone, but without returning any of the residual scrubbing liquid to the vaporizing zone.

6. The process according to claim 5 in which said gas and liquid contact conditions comprise a counter-current flow of the uncondensed products from the reaction zone to the scrubbing liquid.

7. In the process of converting hydrocarbon oils in the vapor phase by the aid of a heated non-condensible heat-carrier gas, the steps which consist in admitting to a reaction zone products destined therefor, including the hydrocarbon material in vapor form to be converted and said heat-carrier gas, allowing the conversion reaction to take place in absence of liquid oil as a result of which free carbon is formed which is entrained with the vapor products of the conversion reaction, passing the non-liquid fluid products from said zone in a stream to a second zone and there introducing a scrubbing agent comprising a hydrocarbon liquid under conditions of gas and liquid contact as to deprive said stream of products of substantially all of their entrained carbon as well as a portion of the heat in said products, and under conditions of temperature as to strip said scrubbing liquid to render it free of any substantial quantity of hydrocarbon constituents which it is desired to convert in said reaction zone whereby any vapors derived from the stripping operation are added to said stream then passing said stream of non-liquid fluid products from said second zone to a third zone, there condensing out the heavier fractions in said stream, removing the hot scrubbing oil as then constituted from the second (scrubbing) zone, then passing it in heat exchange relation with the said condensed heavier fractions to thereby heat the latter, and then subjecting the fractions so heated to vaporizing conditions and passing the produced vapor to said reaction zone there to be converted.

8. In the process of converting hydrocarbon oils in the vapor phase by the aid of a heated non-condensible heat-carrier gas, the steps which consist in admitting to a reaction zone products destined therefor including the hydrocarbon material in vapor form to be converted and said heat-carrier gas, allowing the conversion reaction to take place in absence of liquid oil as a result of which free carbon is formed which is entrained with the vapor products of the conversion reaction, passing the non-liquid fluid products from said zone in a stream to a second zone and there introducing a scrubbing agent comprising a hydrocarbon liquid having light and heavy fractions and containing oil admitted to the system for the purpose of conversion of appropriate fractions thereof, said scrubbing agent being mingled with said stream of products under conditions of gas and liquid contact as to deprive said stream of products of substantially all of their entrained carbon as well as a portion of the heat of said products, and under conditions of temperature as to deprive said scrubbing liquid of substantially all hydrocarbon constituents which it is desired to convert in said reaction zone, returning heat acquired by the scrubbing liquid to the reaction zone by passing said liquid as then constituted in indirect thermal contact with at least one of said products stated to be destined for said reaction zone, and passing said scrubbed stream of products to further condensing means wherein the products whose conversion is desired are dropped out, and returning at least a portion of said products last mentioned in the form of vapor to the reaction zone to be converted.

9. The process of converting hydrocarbon oils in the vapor phase in which a heated heat-carrier gas is used to bring about the conversion reaction in a reaction chamber, such reaction resulting in the formation of free carbon which is entrained in the vapor products leaving the reaction chamber, comprising the following steps: conducting the non-liquid fluid products from the reaction chamber in a stream to a scrubbing chamber, there scrubbing said products with a suitable hydrocarbon medium to remove carbon and heat from said products, then thermally contacting said medium as then constituted with the heat-carrier gas on its way to the reaction chamber to impart heat to said gas, thermally contacting said medium as then constituted with hydrocarbon material on its way to the reaction chamber to impart another portion of its heat to said material, removing from the scrubbing agent carbon taken out of said products and re-using at least a portion of the carbon-deprived medium in the scrubbing step.

10. In the process of converting hydrocarbon oils in the vapor phase by the aid of a heated non-condensible heat-carrier gas, the steps which consist in admitting a hydrocarbon liquid to a vaporizing zone, admitting to a reaction zone products destined therefor, including the hydrocarbon vapor formed in said vaporizing zone and said heat-carrier gas, then when the conversion reaction has taken place passing the non-liquid fluid products from said zone in a stream to a second zone and there introducing a scrubbing agent comprising a hydrocarbon liquid under conditions of gas and liquid contact as to remove any suspended matter present in said stream as well as a portion of the heat in said products, and under conditions of temperature as to strip said scrubbing liquid to render it free of any substantial quantity of hydrocarbon constituents which it is desired to return to said vaporizing zone, then returning heat acquired by the residual scrubbing liquid to the reaction zone by passing said liquid as then constituted in indirect thermal contact with at least one of said products stated to be destined for said reaction zone, but without returning any of the residual scrubbing liquid to the vaporizing zone.

In testimony whereof I have affixed my signature to this specification.

EDWIN W. BEARDSLEY.

CERTIFICATE OF CORRECTION.

Patent No. 1,883,744.                                           October 18, 1932.

EDWIN W. BEARDSLEY.

It is hereby certified that error appears in the printed specification of the above numbered patent requiring correction as follows: Page 4, line 29, claim 4, for "to" read "the", and line 43, strike out the word "the"; and that the said Letters Patent should be read with these corrections therein that the same may conform to the record of the case in the Patent Office.

Signed and sealed this 10th day of January, A. D. 1933.

M. J. Moore.

(Seal)                                                 Acting Commissioner of Patents.